Nov. 14, 1939.　　　J. H. PORTER　　　2,180,066
THREE-WAY DUMP TRUCK
Filed June 22, 1938　　　3 Sheets-Sheet 2
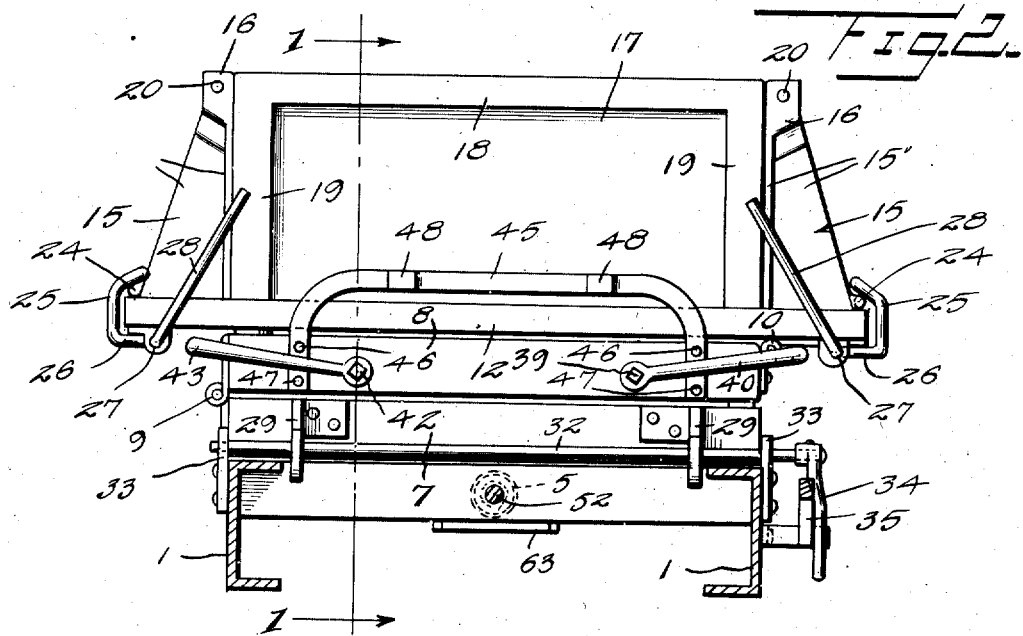
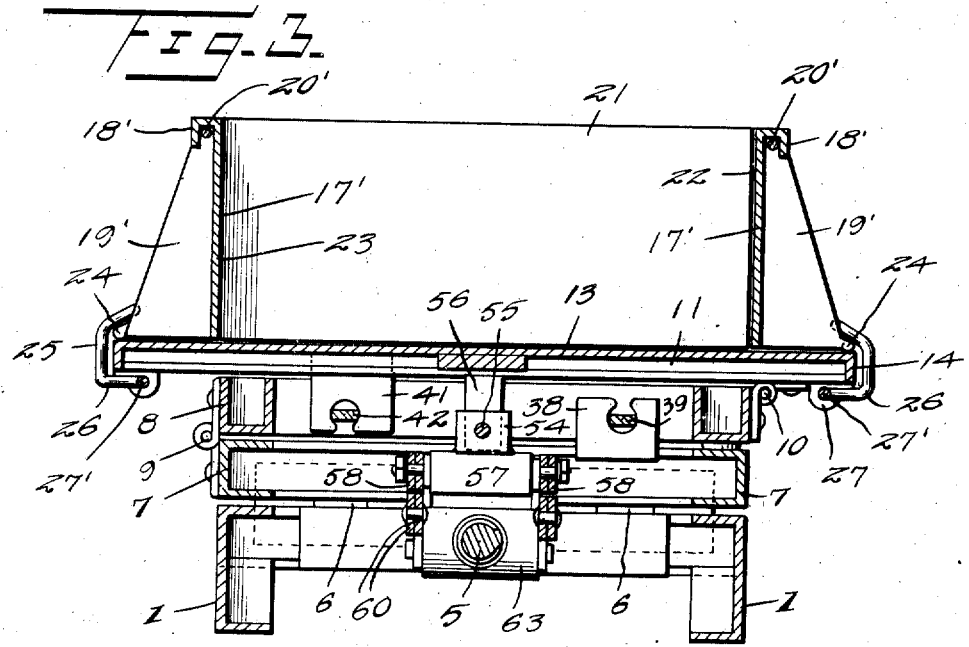
J. H. Porter
INVENTOR
BY Victor J. Evans & Co.
ATTORNEYS Nov. 14, 1939.   J. H. PORTER   2,180,066

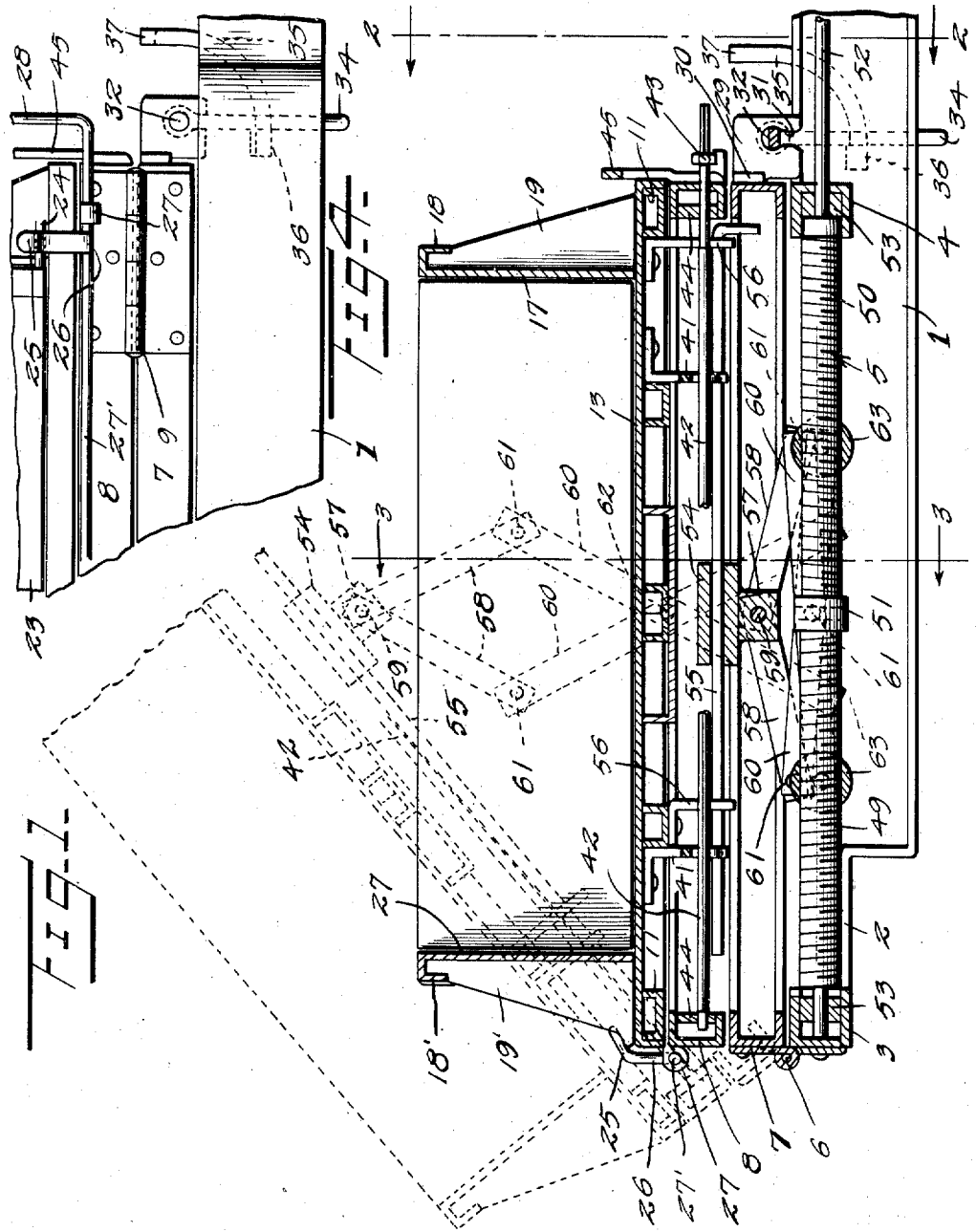

THREE-WAY DUMP TRUCK

Filed June 22, 1938   3 Sheets-Sheet 3

J. H. Porter
INVENTOR

BY Victor J. Evans & Co.
ATTORNEYS

Patented Nov. 14, 1939

2,180,066

UNITED STATES PATENT OFFICE 2,180,066

THREE-WAY DUMP TRUCK

Jesse Hanson Porter, Lonaconing, Md.

Application June 22, 1938, Serial No. 215,258

4 Claims. (Cl. 298—18)

This invention relates to dump trucks and more particularly to such of the three-way dumping type.

The prime object of the invention is to produce a simple yet practical and efficient dumping body structure and mounting and manipulating means therefor whereby the load may be dumped from either side of the body or from the end thereof, at will, and which is readily applied to an ordinary truck frame or chassis.

With the foregoing and other objects and advantages to be attained, the invention consists in the general structure and in the particular parts and combinations and arrangements of parts thereof as hereinafter described and defined in the appended claims, reference being had to the accompanying drawings illustrating a practical adaptation of the invention and in which:

Figure 1 is a longitudinal section through the dumping body and adjacent portion of the truck chassis on which the body and its dumping means are mounted, the body being shown in normal position in full lines and in rear dumping position in dotted lines, the section being taken substantially on the line 1—1 of Figure 2;

Figure 2 is a transverse section through the chassis and taken on or about the line 2—2 of Figure 1, the dumping body and the supporting frame by which it is mounted on the chassis being shown, together with certain operating and controlling parts, in inner end elevation;

Figure 3 is a section taken on or about the line 3—3 of Figure 1;

Figure 4 is a fragmentary view, in side elevation, showing details of the dumping frame controlling means and also the releasable locking means for the respective side and end gates of the body; and, Figure 5 is a cross section showing the body in side dumping positions, the position to the right being shown in full lines and the position to the left in dotted lines.

Figure 5:
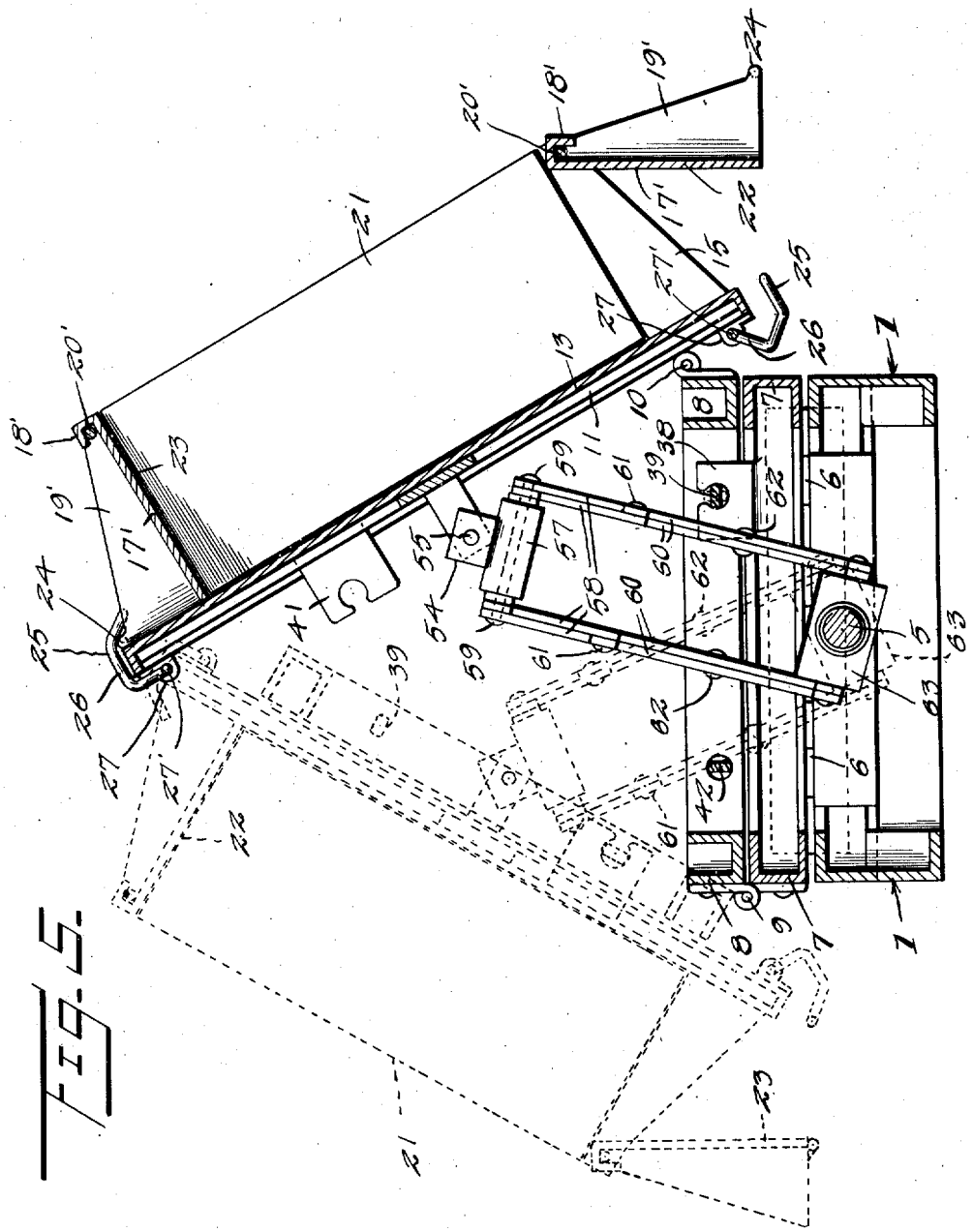

Referring now to the drawings, the numeral 1 designates the longitudinal side members of an ordinary truck frame or chassis, said frame members 1 being of the usual channel section with their flanges turned inwardly. The rear end portions of said longitudinal side members 1 of the frame may be reduced in depth, as at 2, said end portions 2 being connected by the cross member 3, which may be of any conventional cross section, but as shown is channel shaped with its flanges turned inwardly. Some distance inwardly from the end cross member 3 of the frame, if the frame is not already provided with a supplemental cross member, a special cross member 4 may be provided which is preferably of channel shape and has its flanges disposed towards the end cross member 3, said cross members affording opposed supports for an operating screw element 5 to be later more fully described in connection with the mechanism for raising and tilting the body of the vehicle into dumping position and for restoring the body to its normal position.

Hinged at its end to the rear end portion of the chassis, as at 6, is a dumping frame 7, the side and end members of which are preferably of channel section as shown, said side and end members of the frame being welded together or otherwise joined integrally to produce a rigid frame structure. Above the frame 7 is a second dumping frame 8, the side and end members of which are also channel shaped in cross section as in the frame 7, with this difference, however, the flanges of the end members of the frame 8 are horizontal and disposed inwardly while the side members of said frame 8 have their flanges disposed vertically and upwardly. However, the cross section of the frame members is not of the essence of the invention and they may obviously be of any desirable or conventional form giving the required rigidity to the structure. It is rather essential, however, that the frames 7 and 8 be opened and unobstructed throughout the interior extent thereof for ample accommodation of certain mechanically operating and controlling parts to be later described.

The upper frame 8 is hingedly attached at one longitudinal side to the adjacent longitudinal side of the lower frame 7, as at 9, while the opposite longitudnal side of the frame 8 is hingedly attached, as at 10, to the under side of the adjacent longitudinal marginal portion of a bottom frame 11 for the body, which is designated generally by the numeral 12. The frame 11 may be constructed of side and end members of any desirable cross section, but, for practical purposes and to give ample rigidity with compactness of structure, the side and end members of this frame are also preferably channel shape in cross section and the frame may be suitably cross braced or diagonally braced, or in both ways, in any obvious manner. Secured to the top side and marginal portions of the frame 11, preferably by a welding process, is a bottom plate 13, the marginal portions 14 of which are flanged downwardly over the sides and ends of said frame 11.

Extending upwardly from the four corner portions of the bottom plate 13 of the body 12 are rigid corner posts 15, said corner posts being of general right angular form in cross section, that is to say, the major lower portion of each post comprises a pair of integral flanges 15' which are right angular in horizontal section and welded at their lower ends to the top face of the plate 13, said flanges tapering upwardly and merging at their upper ends with integral solid block portions 16. Mounted between the two inner corner posts is a fixed inner end wall for the body 12, said wall comprising a body plate 17, the upper marginal portion of which is rebent outwardly, as at 18, with the extreme flanged edge portion spaced from the body portion to stiffen the structure and the opposite ends of the plate 17 being formed with tapering flanges 19 extending from top to bottom of the plate so as to further stiffen the structure, said end wall being preferably welded to the corner posts and to the bottom plate.

While the inner end wall of the body 12 is fixedly mounted, as just above described, the two longitudinal side walls and rear end wall are pivotally mounted on the respective adjacent corner posts 15 so as to constitute outwardly swinging dumping gates which are normally held in closed position by releasable latch means whereby the respective gates may be selectively opened, at will, according to the side at which the load is to be dumped from the body or when dumped from the end of the body. As shown, the gates are of the same general formation as the fixed end wall 17, that is to say, each of the gates comprises a body plate 17', a rebent and flanged upper marginal portion 18', and outer vertical stiffening portions or ribs 19' similar to the portions 17, 18 and 19 of said fixed end wall, the only material differences being that the gates are hingedly supported by pintles or trunnions 20 projecting from their upper end portions and fitted in bearings provided therefor in the adjacent block portions 16 on the upper ends of the respective corner posts 15.

The pintles or trunnions 20 may obviously comprise separate members suitably attached to the ends of the gates, but, they are preferably integral end extensions of a rod or shaft 20' extending continuously lengthwise of each gate.

For particular individual reference to the respective gates hereinafter, the end gate is designated by the reference character 21, the right hand gate, looking toward the end gate, is designated by the numeral 22, and the left hand gate by the numeral 23. In the normal horizontal position of the body 12, the respective gates 21, 22 and 23, by their pivotal suspension on the corner posts 15 and the outward extension of the base portions of the vertical outer reinforcements 19' on the gates, naturally swing to closed position and excess movement being prevented by the widened base portion of the reinforcement 19' coming in contact at its outer end with the adjacent top face portion of the bottom plate 13 of the body 12, in which position the respective gates are releasably fastened by means now to be described.

Projecting from the base portions of the reinforcements 19' at opposite ends of the gates 21, 22 and 23 are studs 24, said studs 24 being welded or otherwise attached to the reinforcements 19' and projecting beyond the flange portion 15' of the adjacent corner post 15 and engaging said corner post portion as a stop for limiting the inward swinging movement of the gate as well as a keeper for engagement of the hooked portion 25 of a latch member 26 which is hingedly mounted on the under side of the adjacent marginal portion of the body 12, as at 27, it being understood that there is a pair of these latch members 26 for each gate so as to respectively engage the keeper studs 24 at each end of the gate, said latch members being obviously fixedly attached to or formed integrally with a common shaft 27' which is journaled in the supporting brackets or bearings 27 and provided at either or both ends with an operating lever 28 by which the latch elements 26 may be swung to bring their hooked portions 25 into and out of engagement with the keeper studs 24. As the latching provision is the same for each of the side gates and the end gate, the same reference characters are used in each instance.

Normally the lower dumping frame 7 is releasably locked to the truck frame or chassis to prevent upward swinging movement of the frame on its hinge 6. As shown, this locking means comprises a pair of slotted bracket plates 29 having lateral attaching lugs 30 by which they are secured to the inner end member of the frame by welding, riveting or other suitable means, the slots, designated by the numeral 31, extending vertically and being open ended at the bottom; the open end portions of the slots being preferably flared and the closed inner end portions of the slots being rounded and of a diameter somewhat greater than the width of the portions of the slots which constitute a restricted throat between said rounded closed inner end portions and flared mouth portions. In the closed position of the frame 7, said slotted bracket plates 29 are engaged over a locking rod or shaft 32 which is flattened to a thickness whereby to readily pass edgewise through the restricted throats of the slots 31 in said bracket plates 29 and being of a width substantially the same or slightly less than the diameter of the rounded inner end portions of the slots so that after the rod is given a quarter turn after being moved edgewise through the restricted throat into said rounded portion of the slot, as shown in Figure 1 of the drawings, a locking effect is attained which will securely hold the frame 7 in normal position until the rod is rotated a quarter turn back to the position where it can move edgewise through the restricted throat of the slot.

The rod or shaft 32 may be obviously flattened only in the region where it engages the bracket plates 29 but as shown it is continuously flattened throughout substantially its entire length except at or near its opposite end portions which necessarily have to be rounded so as to be rotatably mounted in supporting brackets 33 which are secured to the opposite longitudinal chassis frame members 1, as shown in Figure 2, said bracket members 33 being extended above the frame members 1 to support the rod or shaft 32 sufficiently above said members 1 for free rotation. On either or both ends of the rod or shaft 32 is an operating lever 34 which is located to swing in cooperative relation to an arcuate bracket element 35 on the adjacent side frame member 1 of the chassis, said arcuate bracket member 35 having stop lugs 36 and 37 at its opposite ends to limit the swinging movement of the operating lever 34, the stop lug 36 arresting the operating lever when the locking rod or shaft 32 is turned to the locking position in the rounded portion of the slot 31 transversely of the restricted throat portion of the slot, and the lug 37 arresting the lever when moved to a position to disengage the rod or shaft 32 from the slot 31.

Provision similar to that just above noted for releasably locking the lower supplemental frame 7 to the chassis is made for releasably locking the upper frame 8 to said frame 7 and also for releasably locking the body frame 11 to said upper supplemental frame 8. That is to say, for locking the two frames 7 and 8, the frame 7 is provided near its side opposite to that which is hinged to the frame 8, as at 9, with a pair of upstanding bracket plates 38 which are similarly slotted as the plates 29 which are engaged by the locking rod or shaft 32. These plates 38 cooperate with a locking rod or shaft 39 which is suitably journaled in the upper frame 8 and extends beyond the inner end wall of said frame where it is provided with an operating lever 40 by which the shaft is manipulated in substantially the same manner as the shaft 32. Substantially the same arrangement is provided for locking the body frame 11 to the upper supplemental dumping frame 8, in that a pair of depending bracket plates 41 is attached to the under side of the bottom plate 13 of the body 12, said bracket plates 41 being slotted in the same manner as the hereinabove described bracket plates 29 and 38 and cooperating with a locking rod or shaft 42 which is identical with the shaft 39 and provided on its outer end with an operating lever 43, said rod or shaft 42 being journaled in bearings 44 provided therefor on the inner and outer end members of the upper dumping frame 8, and the same bearing provision being made for the rod or shaft 39. A common guide bracket 45 is provided for the two operating levers 40 and 43, said bracket being of arch shape and fastened at its ends to the inner end member of the dumping frame 8, as at 46, opposed lugs 47 and 48 being provided on the bracket for limiting the swinging movement of the operating levers and indicating the locked and unlocked positions, respectively. That is to say, when the levers are in their lowered position and resting against the stops 47, the rods or shafts 39 and 42 are in locked position and when moved upwardly into engagement with the stops 48 said rods or shafts are in unlocked position.

Normally, with the body 12 and the two dumping frames 7 and 8 in lowered position and locked together and also locked to the chassis 1 of the vehicle, said parts are supported with ample stability and securely held in position, but when the locking means is selectively placed in releasing condition the body 12 may be dumped endwise on the chassis frame or from either side, according to which of the three herein described locking means is released. In other words, to dump the body 12 endwise the locking rod or shaft 32 is turned to permit disengagement of the bracket plates 29 therefrom whereby the body 12 with the two frames 7 and 8 interlocked therewith may be raised on the hinge 6 to the position shown by dotted lines in Figure 1; or, by releasing only the locking rod or shaft 39, the body may be raised on the hinge 9, carrying therewith the upper frame 8, to the dumping position indicated by dotted lines in Figure 5, while by releasing only the locking rod or shaft 42, the body 12 alone is raised on the hinge 10 to the dumping position shown in full lines in Figure 5.

Means for raising and lowering the body 12 to and from dumping position will now be described. As shown, this means includes the screw element 5, first herein generally described, said screw element being formed with separate right and left hand threaded portions 49 and 50 with a collar 51 at its middle, said screw element 5 being fixed on a shaft 52 journaled in bearings 53 provided therefor on the outer end frame member 3 of the chassis 1 and on the inner cross frame member 4 of the chassis frame.

Cooperating with the screw element 5 is a lazy tongs arrangement of compound links and levers which are pivotally attached to a block 54 which is slidable endwise and rotatable on a supporting and guiding bar 55, said bar 55 being supported adjacent its opposite ends on bracket members 56 depending from the under side of the body 12, one of said brackets, as shown, being secured to a cross member of the bottom frame 11 of the body and the other bracket member being secured directly to the under side of the bottom plate 13. The block 54 is provided on its under side with a transverse elongated portion 57 to which pairs of toggle links 58 are pivotally attached at its opposite ends, as at 59, the respective pairs of toggle links pivotally attached at the opposite ends to the end portions of crossed lever members 60, as at 61, said crossed levers being pivotally attached to each other, as at 62. The ends of the crossed levers 60 opposite to those which are pivotally attached, as at 61, to the toggle links 58, are pivotally attached to traveling blocks 63 having transverse screw threaded bores fitted respectively to the right and left hand screw threaded portions 49 and 50 of the screw element 5. By this provision, when the screw element 5 is rotated in one direction, the traveling blocks 63 are moved toward each other on the screw element thereby extending the lazy tongs upwardly and thereby raising and tilting the body 12 on one of its hinges 6, 9 or 10, as the case may be, according to which of the locking rods or shafts 32, 39 or 42 may be turned to releasing position, it being obvious that the block 54 rotates about the axis of the bar 53 during the sidewise tilting movement of the body but slides longitudinally of said bar when the body is dumped endwise. To lower the body 12, the screw element 5 is rotated in the opposite direction so as to move the traveling blocks 63 in the direction away from each other, thereby contracting the lazy tongs. In this connection it is noted that the raising and lowering mechanism including the lazy tongs and the screw element 5 is not only powerful and easily operated, either manually or by special power actuated means, but the body is held in different raised positions.

Obviously, the shaft 52 on which the screw element 5 is mounted may be rotated in the raising and lowering of the body 12 by any suitable manually operable or other means (not shown), it being deemed unnecessary to illustrate the same herein as it does not enter directly into the present invention.

While the structure herein illustrated embodies a practical adaptation of the invention, it is understood that the structure admits of considerable modification within the spirit of the invention as defined in the appended claims. The invention, therefore, is not limited to the specific construction and arrangement shown in the accompanying drawings.

What is claimed is:

1. In a dump truck, a pair of coinciding open rectangular supplemental dumping frames superimposed upon the chassis frame of the truck, the lower supplemental frame being hingedly attached at one end to the end of the chassis frame and the upper supplemental frame being hingedly attached at one side to the corresponding side of the lower supplemental frame, a body hingedly attached at its side to the side of the upper supplemental frame opposite to that side of said frame which is attached to the lower supplemental frame, separate selectively operable means for releasably locking the lower supplemental frame to the chassis frame, the upper supplemental frame to the lower supplemental frame and the body to the upper supplemental frame, and power means cooperably arranged directly between the chassis frame and said body and operating through said supplemental frames to raise and lower the body according to the selective release of said frame-locking means.

2. In a dumping body mounting, in combination with a chassis, a pair of superimposed dumping frames hingedly attached at one side to each other, the lower frame being hingedly attached at one end to the chassis, a body hinged at one side to the adjacent side of the upper dumping frame which is opposite to its side hinged to the lower frame, lifting means mounted on the chassis and extending through the dumping frames into cooperative supporting engagement with the body, separate locking means for releasably locking the lower dumping frame to the chassis, the upper dumping frame to the lower frame and the body to the upper frame, said locking means including bracket members on one element having open-ended slots with restricted throat portions and rounded inner enlargements, and locking rods mounted rotatably on the other element, said rods having flattened portions to pass edgewise through the restricted throat portions of said slots in said bracket members, said flattened portions of the rods being of a width approximately the same as the diameter of the rounded portions of the slots.

3. In a dumping body mounting for trucks and the like, in combination with a chassis, a pair of superimposed open rectangular dumping frames supportingly interposed between the chassis and the body, said frames being hinged to each other at one longitudinal side, the lower frame at one end to the chassis and the upper frame at its opposite longitudinal side to the corresponding side of the body, separate means for releasably locking the frames together, the lower frame to the chassis and the upper frame to the body, and common power means directly applied for raising and lowering the body when either unlocked from the upper dumping frame or with said upper frame locked thereto and unlocked from the lower dumping frame, and also when both frames are locked to the body and the lower frame is unlocked from the chassis, said means including a block slidable longitudinally and rotatable on a supporting bar carried by the body longitudinally and medially on the under side thereof, a screw element rotatably mounted on the chassis parallel and vertically coincident with the longitudinal axis thereof, said screw element having opposed right and left hand threaded portions, transversely disposed traveling blocks on said right and left hand threaded portions of the screw element, and a toggle power connection between said longitudinally slidable and rotatable block on said body-carried supporting bar and said traveling blocks on the screw element, said toggle power connection comprising two companion pairs of crossed pivotally attached lever members, said crossed members being pivotally attached at one end to the ends of the traveling blocks on the screw element and having pivotal link connections between their opposite ends and said longitudinally slidable and rotatable block on said body-carried supporting bar.

4. The herein described dump truck comprising in combination with a chassis and a superimposed body provided and arranged for lateral dumping at either side and also for endwise dumping on the chassis, with separate selectively operable means for controlling the direction of body dumping, and power means for raising the body to dumping position and returning it from such position, said means comprising a longitudinal supporting bar dependingly attached to the bottom of the body and extending in medial parallel relation to the longitudinal axis of the body, a block mounted on said supporting bar with longitudinal and rotatable movement, a longitudinal screw element rotatably mounted on the chassis parallel and axially coincident with a vertical plane coinciding with the longitudinal axis of said supporting bar, said screw element having opposed right and left hand threaded portions, oppositely traveling blocks respectively mounted on said right and left hand threaded portions of the screw element, and a toggle power connection between said slidable and rotatable block on the supporting bar and said traveling blocks on the screw element, said power connection comprising companion pairs of pivotally attached crossed levers respectively located at opposite sides of all of said blocks, said crossed levers being pivotally attached at one end to one each of said traveling blocks on the screw element and having a pivotal link connection at their opposite ends to said slidable and rotatable block on the supporting bar and co-axially with each other.

JESSE HANSON PORTER.